(12) United States Patent
Tice et al.

(10) Patent No.: US 6,606,028 B1
(45) Date of Patent: Aug. 12, 2003

(54) APPARATUS AND METHOD FOR SUPERVISION

(75) Inventors: Lee D. Tice, Bartlett, IL (US); Robert J. Clow, Aurora, IL (US); Manley S. Keeler, Naperville, IL (US)

(73) Assignee: Pittway Corporation, Chicago, IL (US)

( * ) Notice: Subject to any disclaimer, the term of this patent is extended or adjusted under 35 U.S.C. 154(b) by 0 days.

(21) Appl. No.: 09/298,267

(22) Filed: Apr. 23, 1999

(51) Int. Cl.$^7$ ............................................. G08B 29/00
(52) U.S. Cl. ..................... 340/506; 340/508; 340/650
(58) Field of Search ............................. 340/511, 590, 340/650, 661, 505, 506, 508, 512, 515, 825.36; 379/22.03, 22.07, 24

(56) References Cited

U.S. PATENT DOCUMENTS

| | | |
|---|---|---|
| 3,825,824 A | 7/1974 | Herron et al. |
| 4,470,047 A * | 9/1984 | Vogt et al. ................. 340/511 |
| 4,916,432 A | 4/1990 | Tice et al. |
| 5,056,023 A * | 10/1991 | Abe ........................... 340/439 |
| 5,721,662 A * | 2/1998 | Glaser et al. ................ 361/119 |
| 5,850,178 A * | 12/1998 | Ha et al. ..................... 340/512 |
| 5,933,077 A * | 8/1999 | Vogt et al. .................. 340/506 |

FOREIGN PATENT DOCUMENTS

| | | |
|---|---|---|
| EP | 0 353 156 A1 | 1/1990 |
| GB | 2 099 595 A | 12/1982 |
| GB | 2 173 618 A | 10/1986 |

OTHER PUBLICATIONS

Search Report dated Sep. 28, 2000 from the British Patent Office for British Application No. GB 0009912.7, counterpart of above US application.

* cited by examiner

*Primary Examiner*—Van Trieu
(74) *Attorney, Agent, or Firm*—Welsh & Katz, Ltd.

(57) ABSTRACT

A supervisable multi-processor communication system includes circuitry and executable instructions for evaluating the communication capability of a plurality of branches in the system. Branches which exhibit a non-communicating condition, such as an open circuit can be identified. By conducting communications with electrical units on identified branches, the location of an open circuit, relative to one of the electrical units can be established.

69 Claims, 4 Drawing Sheets

APPARATUS AND METHOD FOR SUPERVISION

FIELD OF THE INVENTION

The invention pertains to supervisable communications systems. More particularly, the invention pertains to such systems which can be used to detect alarm conditions and which incorporate a plurality of programmed processors.

BACKGROUND OF THE INVENTION

Alarm indicating systems are known and have been recognized as being useful in providing early indications of the presence of abnormal conditions such as smoke or gas. Known systems can be implemented in the form of multi-processor communication systems wherein some of the processors are coupled to ambient condition sensors.

Known systems provide bi-directional communication links, which can be coupled to a control element or control panel, to provide electrical energy and signals to the processors coupled thereto. It has been recognized that the physical length of such links can impose limitations on the number of processors that can be coupled thereto. This can also be affected by the quality of the links.

In addition to wanting to incorporate larger numbers of processors into such systems, there is usually a requirement that the links be supervised in some way. One known form of supervision of electrical cables involves applying test electrical signals, for example a current, to the cables. In the event of an open circuit, the current will cease.

There continues to be a need to be able to support additional numbers of processors on a given communication system for a given level of communication link quality. Additionally, there is a continuing need to be able to supervise the condition of such links so as to be able to deal with communication failures due to, for example, open circuit conditions in wired systems.

SUMMARY OF THE INVENTION

A supervisable communication system incorporates at least two communication links, either one of which is capable of supplying electrical energy to a plurality of remote units coupled thereto. Members of a plurality of branches are coupled across the links. Operating units, for example programmed processors, can be coupled to each of the branches.

The operating units can receive electrical energy and communications via the links and the branches. In one aspect, a control element can be coupled to the communication links. In another aspect, the links can be implemented as wire or optical cables.

The control element implements a supervision function of the branches. Communication failures or open circuit conditions can be detected.

At least one isolator is located in each of the branches. The isolators, in response to messages received from the control element can block communications on a respective branch as by open circuiting the branch in a wired system.

By blocking communications on each of the branches, except a selected branch, the selected branch can be evaluated for a non-communication, such as an open circuit, condition. In another aspect, each of the branches can be serially evaluated to determine whether the respective branch exhibits a communication condition or a non-communication condition as, for example, evidenced by an open circuit.

The control element can couple an electrical signal to one of the links. If all but one of the branches has been blocked, for example by open circuiting them, the receipt of that signal on the other link is an indication that the branch being evaluated is exhibiting a communicating state. In the absence of a communicating state, perhaps due to an open circuit in the branch, the electrical signal will not be received at the sensing link.

In a wired communication system wherein the links are implemented with conductive cable and the branches are in turn implemented by conductive cable, an open circuit condition on any of the branches can be identified by the control element. In addition, the location of the open circuit condition on a selected branch can be established, relative to electrical units coupled to the branch.

In yet another aspect, the control element can be implemented using a programmed processor. Sequences of instructions stored at the control element carry out a process of open circuiting all of the branches but one and evaluating a communications parameter of the one branch. In this fashion, each of the branches can be evaluated. Where one or more branches is determined to be exhibiting a non-communication or an open circuited condition, executable instructions at the control element, by transmission of selected signals to the branch can in turn establish the location of the open circuited condition.

Alternate architectures include coupling each of the branches to a multiplexer. The multiplexer, for supervision purposes, can sequence through and select each of the branches for evaluation. In yet another alternate, the ends of each of the branches can be coupled to a common control element. The other end of each branch can be coupled to a communications link or user which in turn is coupled to the control element.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

Figure 1:
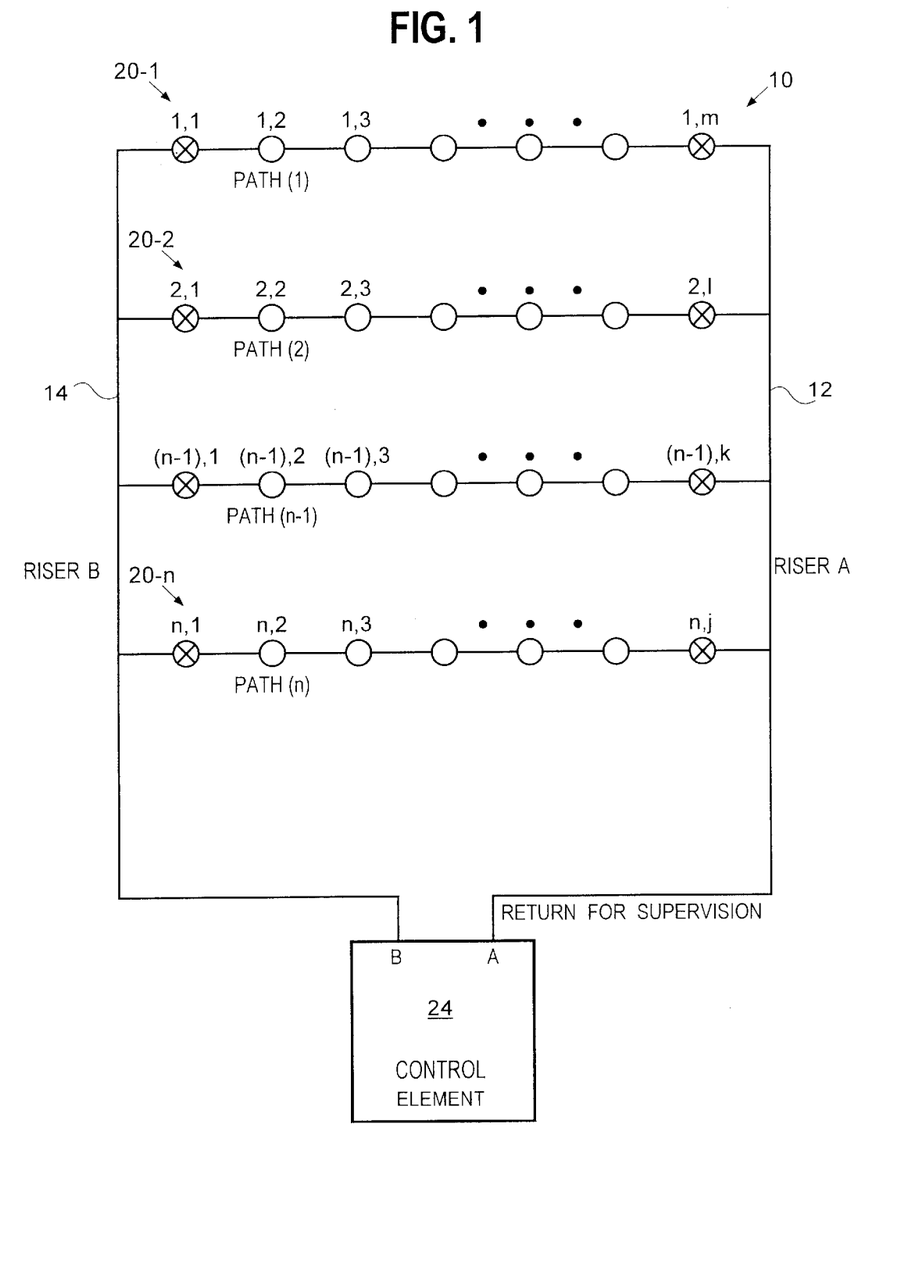
FIG. 1 is a over-all block diagram of a system in accordance with the present invention.

FIG. 1 illustrates a system 10 which includes first and second risers or communication links 12, 14. The links 12, 14 could be implemented as electrical or optical cables. Both of the links 12, 14 are capable of providing electrical energy to operating units in the system as discussed subsequently. It will also be understood that links 12, 14 could incorporate multiple electrical conductors or optical paths without departing from the spirit and scope of the present invention.

A plurality of branches 20-1, 20-2 . . . 20-n is coupled in parallel across links 12, 14. Each of the branches, for example 20-1, includes a plurality of operating units, some of which could incorporate programmed processors, 1, 1; 1,2 . . . 1,m.

Figure 2:
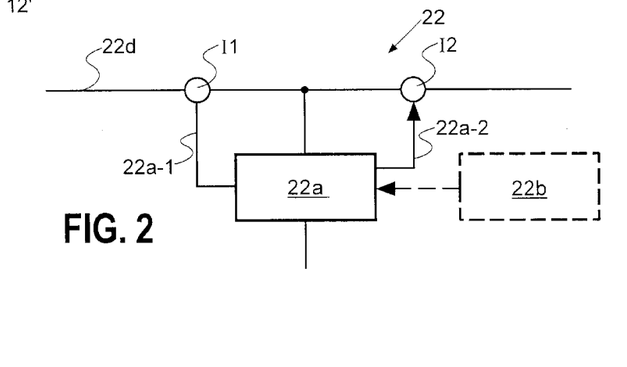
FIG. 2 is a block diagram of an electrical unit usable in the system of FIG. 1.

The electrical units carried on the branches can be implemented in a variety of configurations without departing from the spirit and scope of the present invention. For example, FIG. 2 illustrates a block diagram of an electorial unit 22 usable in the system 10.

The unit 22 includes a programmed processor 22a coupled to first and second isolator circuits I-1, I-2. Circuits I-1, I-2 could be implemented as either solid state or mechanical switches without departing from the spirit and scope of the present invention. It will also be understood that a given electrical unit might incorporate a single isolator or none at all as explained below. Isolators could also be incorporated into separate isolator units.

The unit 22 can incorporate a sensor 22b illustrated in phantom. It will be understood that the presence or absence or the nature of the sensor 22b is not a limitation of the present invention. The sensor 22b could be an ambient condition sensor such as a smoke sensor.

Processor 22a via lines 22a-1, 22a-2 is capable of placing either of the isolators I-1, I-2 in a blocking or a non-blocking state. In the case of a wired system, isolators I-1, I-2 would function to open circuit or short circuit communication branch 22d.

Again with reference to FIG. 1, system 10 can also incorporate a control element 24. The element 24, which might include one or more programmed processors and prestored instructions for carrying out a plurality of functions as described subsequently, also includes one or more sets of terminals indicated generally at A, B for coupling to the respective link or riser 12, 14. It will also be understood that the operating units coupled to the branches such as branch 20-1, can carry out bidirectional communications not only with the control element 24 but between and among one another without departing from the spirit and scope of the present invention.

In one form, system 10 can be implemented to carry out supervision of a region and to provide an indication of an alarm condition such as a fire or hazardous gas or both. In other aspects, system 10 could incorporate lighting control functions as well as security functions such as door access control and the like including intrusion alarms.

As noted above, each of devices or units can contain one or more isolator circuits. At least the devices at each end of the parallel branches contain isolators to keep short circuits on a given branch from affecting the entire system 10. The more devices that include isolators, the less effect short circuits will have on the system. For the following example, and without limitation, assume that each device includes at least one isolator.

In normal supervision of the system 10, while all devices (1,m), (2,1), . . . ,(n−1,k), (n,j) contain isolators, only one is closed at a time. The closed isolator results in a continuous path being established between the connections A and B. Since only one isolator is closed at a time, only one path is established at a time.

Thus, when a selected branch has a closed isolator if a supervisory signal is coupled to terminal B by control element 24 that signal, or a representation of it should be detectable at supervisory terminal A.

By rotating through these devices one at a time in a sequenced pattern, all the branches can be tested or evaluated one at a time. Any open circuit in a selected branch will be detected when that associated isolator is closed because that open circuit will prevent the test or evaluation signal, a voltage or a current for example, transmitted from connection B from being detected at the connection A.

The advantage of this method is that the path of power delivery to any device in the system from element 24 at B and/or A will be shorter than in a system where all devices are connected in a single branch between connection B to connection at A. Because of this shorter path, there is less line resistance loss and less loss from the resistance of each device's isolators (typically 0.1 ohm each). For very high power delivery, this is extremely important.

Once an open circuit has been detected, the element 24 can switch to provide power from both connection B and connection A to overcome the open circuit. At the same time, devices (1,m), 2,1), (n−1,k), and (n,j) can close their isolators to increase power delivery from connection A to as many devices as possible with the shorted wire lengths.

In addition, it is possible to locate the exact location of the open circuit in this system by using a self-location method to determine which devices are capable of receiving data transmissions from other devices.

For example, assume that an open circuit occurs between device (n,2) and (n,3) in branch n with j representing the number of devices across this branch. When it comes time for device (n,j) to close its isolator, there will be no path between connection B and connection A. Given the open circuit in branch n, a supervisory signal from terminal B will not be sensed at terminal A.

The element 24 can then determine that an open circuit exists in branch n and immediately supply communications signals and power from both connection B and connection A.

In response to the open circuit condition, element 24 can then command all of the end devices (1,m),(2,l), . . . , (n−1,k), and (n,j) to close their isolators. Power will then be delivered to all devices from both sides through both connection B and connection A. Hence, the open circuit will not make the respective branch inoperative. Nor will it make system 10 inoperative.

Periodically, element 24 can switch to drive only connection B and rotate through the end of branch devices to check to see if the open circuit is still present or if it has been repaired. If it has been repaired, then the control element returns to normal operation.

In a similar approach, power can always be normally provided from both connections B and A. However, in a preferred mode, the communications signals are normally only transmitted from connection B. Communication signals are an example of the type of signals that can be checked at connection A to determine if there is an open circuit with the above-described method.

All of these events can be logged by element 24 for display and record keeping purposes.

In accordance with the following methods, the branch that has the open circuit can now be checked to find the exact location of the open circuit. This is accomplished by the end device transmitting a selected signal, a data pulse, during a self-locate sequence. In this sequence, all the devices on the branch keep their isolators closed.

The data pulse from the end device will propagate along the branch until it encounters the open circuit and then stop. The devices that recorded the presence of the data pulse will then report to the control element 24. Devices further away from the end unit and after the open circuit will not detect the data pulse transmitted from the end unit. Hence, the location of the open circuit will be after the last device that did sense the pulse.

For example, with an open circuit between units (n,2) and (n,3), unit (n,j) transmits a data pulse along the branch n. Unit (n.3) will detect the pulse but unit (n,2) will not because of the open circuit. The location of the open circuit is thus established.

In another approach, the element 24 can poll along the branch that it has determined has an open circuit, by transmitting the communications signals from terminal B. All the end devices have their isolators open with the exception of the end device of the path with the open circuit present. Terminal A can still be delivering power but no communications. With an open circuit between (n,2) and (n,3), the element 24 will only be able to communicate to devices (n,1) and (n,2) but not (n,3). The location of the open is thus established.

As an alternate, to using the first method to determine if there is an open circuit, the self locate method could be used. For example, if the end device of a branch transmits a data pulse all devices on the branch should detect it. A device that does not detect it transmits a message to the element 24 indicating an open circuit. Based upon the devices that transmit this message, the exact location of the open circuit is also established.

Once an open circuit has been detected, the element 24 can switch to provide power from both terminals A and B to overcome the open circuit. At the same time, devices (l,m),. 2(2,1), (n−1,k), and (n,j) can close their isolators to increase power delivery from terminal A to as many devices as possible with the shorted wire lengths.

Figure 3:
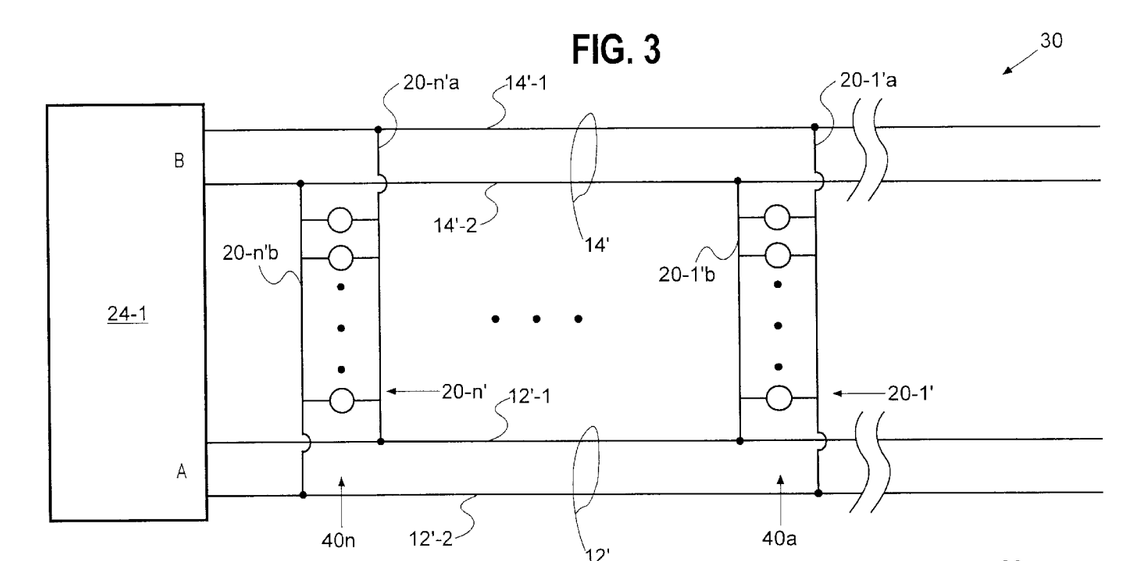
FIG. 3 is a more detailed block diagram of one embodiment of the system of FIG. 1.

FIG. 3 is a block diagram of a system 30 illustrating additional details of connectivity of the various links and branches. As illustrated in FIG. 3, links 12', 14' each include first and second members.

In the event that links 12' and 14' are conductive cables, one or both of 12'-1 and 14'-1 can provide electrical energy to or communications signals to one or more of branches 20-1'. . . 20-n'. Elements 12'-2 and 14'-2 represent return paths in the case of electrical cables. As illustrated in FIG. 3, each of the branches 20-1' . . . 20-n' has two elements 20-1'a 20-1'b . . . 20-n'a 20-n'b. Each of 20-1'a . . . 20-n'a which are in turn coupled to 12'-1, 14'-1 can be used to provide electrical energy and/or data signals to a respective plurality of electrical units 40a . . . 40n.

Control element 24' can carry out the same type of processing, described previously, for purposes of establishing which of the branches 20-1' . . . 20-n' is exhibiting an open circuit. Subsequently the location of the open circuit relative to one of the units on the respective branch can be established. In summary, as described above, in a supervisory mode control element 24 will open circuit each of the paths independently, except for the one being supervised, to establish if that one is exhibiting a non-communicating or open circuited characteristic.

Figure 4:
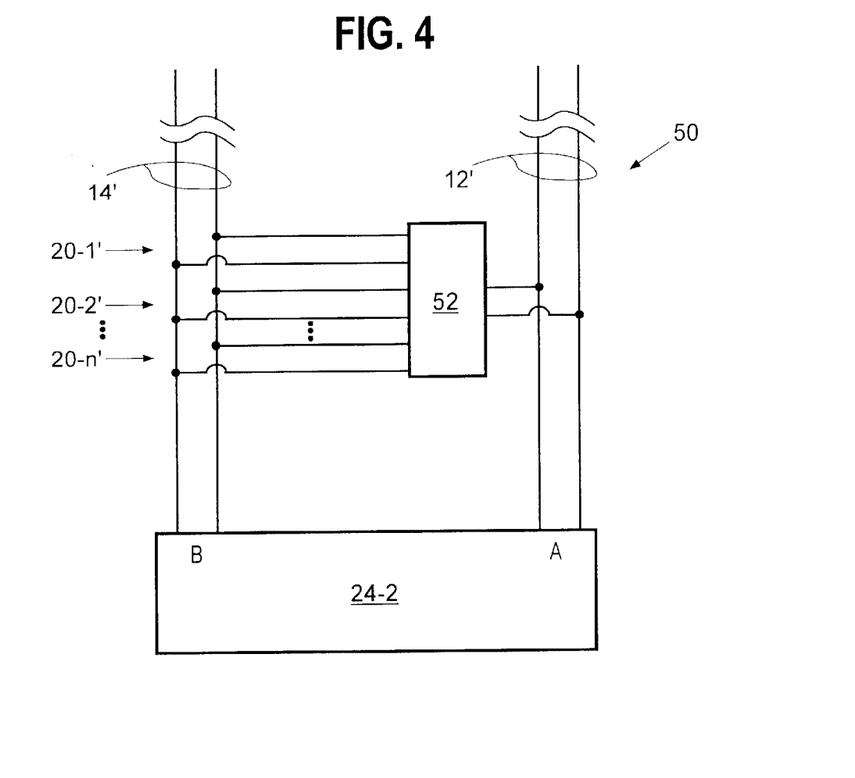
FIG. 4 is a block diagram illustrating details of yet another embodiment of the system of FIG. 1.
Figure 5:
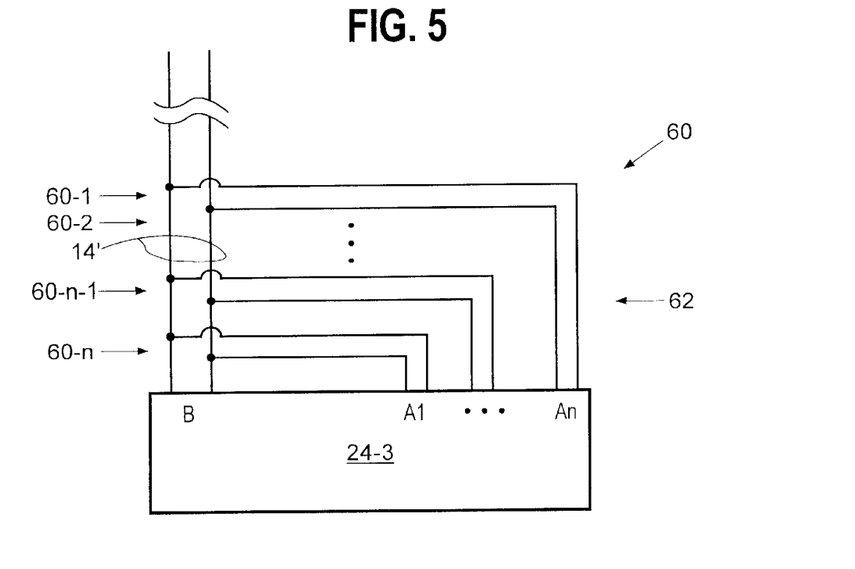
FIG. 5 is a block diagram of yet another embodiment of the system of FIG. 1.

FIGS. 4 and 5 illustrate block diagrams of systems having alternate architectural configurations which are in accordance with the spirit and scope of the present invention. In FIG. 4, system 50 having a control element 24-2 incorporates multi-path links 12' and 14'. Branches 20-1', 20-2' . . . 20-n' are coupled between link 14' and a multiplexer 52.

The multiplexer 52 is in turn coupled to link 12'. In response to signals communicated by control element 24-2, multiplexer 52 selects which of the branches 20-1' . . . 20-n' are to be short circuited, leaving the rest of the branches open circuited, for supervision purposes as described above. Element 24-2 can in turn, using multiplexer 52, sequence through each of the branches with one branch having a short circuited state and all the other branches having open circuited states so as to establish which branch, if any, is exhibiting an improper open circuited state.

In FIG. 5, an alternate system 60 utilizes a plurality of return links 62 which are in turn coupled to a plurality of return ports $A_1 \ldots A_n$. Each of the branches 60-1 60-2 . . . 60-n can be independently supervised to assess the presence of an open circuit or non-communicating state by switching ports $A_1 \ldots A_n$ sequentially so that only one branch is active at a time.

Figure 6:
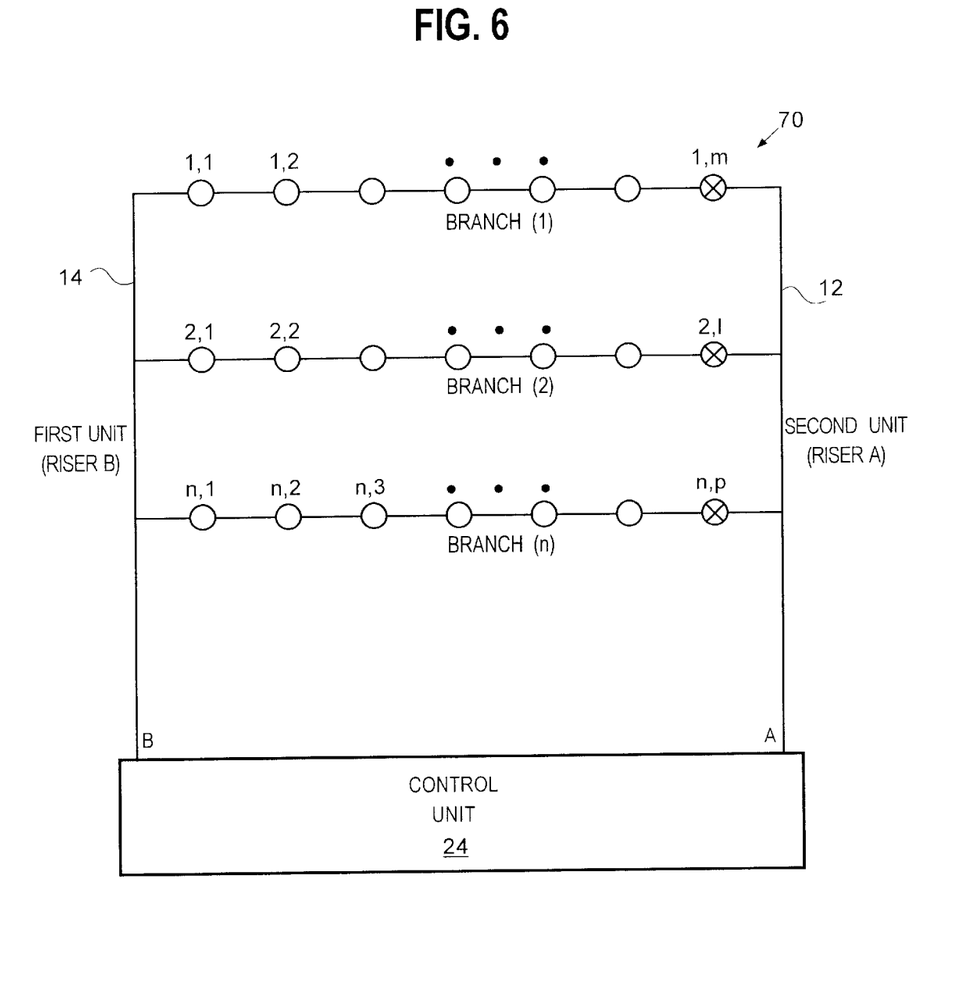
FIG. 6 is a block diagram of an alternate system in accordance herewith.

In another system 70 and method of implementation of this invention, the devices themselves are capable of monitoring the communications on the first link and the second link as illustrated in FIG. 6. In this embodiment, the communication units such as 1,m, 2,1 and n,p have the capability of blocking the communications on the respective branch.

During normal operation, each branch is blocked by the respective communication unit. The control unit 24 sends communication messages on both links 12, 14. The respective communication unit monitors both sides to receive these communications. The respective communication unit is blocking communications from the first link to the second link and communications from the second link to the first link.

If an open circuit occurs in the branch between the respective communication unit and the first link 14, the communication message transmitted on the first link will not be received by the respective communications unit such as 2,1 in branch 2. The same holds for the second link. If an open circuit occurs in the branch between the respective communication unit and the second link, the communication message transmitted on the second link will not be received by the respective communications unit.

A selected, trouble, condition is realized by these communications failures. The system then identifies the location of the open circuit.

The location of the open circuit can be determined by having the communication unit unblock the respective branch. The system sends messages on both the first link and the second link. The devices installed on the branches are capable of determining if communications are received from both directions (from the first link and from the second link).

The devices on one side of the open circuit will only receive communications from that one direction due to the open circuit. Devices on the other side of the open circuit will only receive communications from the other side. These devices then transmit the identifying information that is used to locate the open circuit.

The communication messages used to identify the location of the open circuit could be sent by the control unit 24. Alternately, they could be sent by the respective communication unit through the control unit 24 so they appear on both the first link 14 and the second 12.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A communication system comprising:
   at least first and second communications links;
   a plurality of branches coupled between the links wherein each of the branches includes a plurality of communications units coupled thereto and circuitry whereby communications can be blocked on all branches, except for a selected branch whereby a status parameter of the selected branch can be evaluated.

2. A system as in claim 1 comprising a control element coupled to the links and including circuitry for evaluating the status parameter of the selected branch.

3. A system as in claim 2 wherein the control element includes circuitry for evaluating the status parameter of a plurality of the branches.

4. A system as in claim 2 wherein one of the links comprises a plurality of switchable conductors coupled to the element whereby each branch has a first end and a second end and wherein the first ends are coupled to the other link and the second ends are coupled to respective ones of the switchable conductors at the element.

5. A system as in claim 1 comprising a programmed control element coupled to the links and including prestored executable instructions for evaluating the status parameter of the selected branch.

6. A system as in claim 5 which includes prestored executable instructions for sequentially evaluating a status parameter of more than one of the branches.

7. A system as in claim 6 which includes prestored executable instructions for sequentially evaluating a status parameter of a second plurality of branches.

8. A system as in claim 7 wherein the second plurality comprises the plurality of branches.

9. A system as in claim 1 wherein the links each comprise one of an optical communications cable or a conductive communications cable.

10. A system as in claim 9 wherein the links comprise conductive communications cable and the branches comprise conductive communications cables.

11. A system as in claim 10 wherein evaluating the status parameter of a selected branch comprises evaluating an open circuit or a short circuit condition thereof.

12. A system as in claim 11 which includes a control element coupled to the links.

13. A system as in claim 12 wherein the control element includes circuitry for sequencing through the branches to establish a corresponding plurality of open and closed circuit conditions.

14. A system as in claim 13 wherein the control element includes circuitry for establishing, for at least a selected branch exhibiting an open circuit condition, the location of the condition, the location of the condition relative to at least one unit on the branch.

15. A system as in claim 14 wherein the control element includes prestored instructions for sequencing through at least some of the branches.

16. A system as in claim 15 wherein the control element includes instructions for establishing the location of the condition.

17. A system as in claim 16 wherein the control element includes instructions for transmitting evaluation signals to the selected branch for establishing the location.

18. A system as in claim 17 wherein the control element includes circuitry, responsive to the evaluating signals, for establishing the location.

19. A system as in claim 18 wherein the control element includes circuitry for receiving signals from units on the selected branch indicative of the location.

20. A system as in claim 13 wherein the control element includes circuitry for coupling electrical energy to at least one of the links.

21. A system as in claim 20 wherein the control element includes circuitry for coupling electrical energy to both of the links.

22. A system as in claim 20 wherein the control element includes circuitry for switching electrical energy between the links.

23. A system as in claim 22 wherein the control element includes circuitry for transmitting selected messages to a selected of the links.

24. A system as in claim 23 wherein the messages open circuit respective ones of the branches.

25. A system as in claim 1 wherein at least some of the units include programmed processors.

26. A system as in claim 1 wherein at least some of the units comprise ambient condition detectors.

27. A system as in claim 1 wherein at least one unit of each plurality includes isolation circuitry for blocking or permitting communications on the respective branch.

28. A system as in claim 1 which includes a multiplexer coupled between the members of the plurality and one of the links whereby a branch can be selected and whereby the status parameter of the selected branch can be evaluated.

29. A system as in claim 1 wherein some of the units include sensors.

30. A system as in claim 29 wherein some of the sensors detect respective ambient conditions.

31. A system as in claim 29 wherein the sensors are selected from a class which includes intrusion detectors, fire detectors, gas detectors, non-fire temperature detectors, position detectors and velocity detectors.

32. A communication system comprising:
   at least first and second communications links;
   a plurality of branches coupled between the links wherein each of the branches includes a plurality of communications units coupled thereto and circuitry for selectively blocking the communications between the links on all branches except for one;
   circuitry for sending a communication signal on the first link and detecting the communication signal on the second link;
   circuitry for generating a trouble condition if the communication signal is not detected on the second link; and
   wherein the trouble condition is an open circuit in the branch and the location of the open circuit is determined by a common controller sending a command for the devices from both the first link and the second link and the devices that do not receive the command from both links send an open circuit message to the common controller.

33. A system as in claim 32 wherein the branch that is not blocked is changed periodically.

34. A system as in claim 33 wherein all of the branches have been in a condition where they were not blocked during a predetermined time period.

35. A system as in claim 32 wherein a common controller sends commands to the communication unit to block or unblock the branch.

36. A system as in claim 32 wherein the said communication unit has been preprogrammed to automatically block or unblock the branch.

37. A system as in claim 32 wherein the said communication unit is one of an ambient condition detector, an input module, and an output module.

38. A system as in claim 32 wherein the selected condition is an open circuit in the branch and the location of the open circuit is determined from the devices that are between the open circuit and the communication unit transmitting messages.

39. A system as in claim 32 wherein the trouble condition is an open circuit in the branch and the location of the open circuit is determined by the devices installed on the branch receiving a transmission from the said communication unit after it unblocked the branch.

40. A communication system comprising:
at least first and at least second communications links;
a plurality of branches coupled between the links wherein each of the branches includes a communications unit in each branch which unit includes circuitry for blocking the communications between the links;
circuitry for sending a communication signal on the first link and detecting the communication signal at the respective communication unit of each branch;
additional circuitry for sending a communication signal on the at least second link to the communication units and indicating a selected condition if the respective communication units did not receive both the communication from the first link and the at least second link; and
where there is an open circuit in the branch, the location of the open circuit is determined by a common controller sending a command for the devices from both the first link and the second link and the devices that do not receive the command from both links send an open circuit message to the common controller.

41. A system as in claim 40 wherein the selected indication is displayed at the respective communication unit.

42. A system as in claim 40 wherein the selected indication is displayed at a location remote from the respective communication unit.

43. A system as in claim 40 wherein the communications signals are transmitted simultaneously on both the first and at least second links.

44. A system as in claim 40 wherein the communications signals are different.

45. A system as in claim 40 wherein the communication unit includes circuitry for determining if the communications signals are being received from both the first link and the at least second link.

46. A system as in claim 40 wherein the communication unit couples the respective branch that includes it to the at least second link if it does not receive communication signals from the first link.

47. A system as in claim 40 wherein the communication unit transmits a selected signal when the communications signals are not received from the first link.

48. 3A system as in claim 47 wherein the communication unit transmits the selected signal on the at least second link.

49. A system as in claim 40 wherein a common controller sends commands to the communication unit to block or unblock the branch.

50. A system as in claim 40 wherein the said communication unit has been preprogrammed to automatically block or unblock the branch.

51. A system as claim 40 wherein the said communication unit is one of an ambient condition detector, an input module, and an output module.

52. A system as in claim 40 wherein the selected condition is an open circuit in the branch and the location of the open circuit is determined from the devices that are between the open circuit and the communication unit transmitting messages.

53. A system as in claim 40 wherein the trouble condition is an open circuit in the branch and the location of the open circuit is determined by the devices installed on the branch receiving a transmission from the said communication unit after it unblocked the branch.

54. A communication system comprising:
a first and at least a second communications link;
a plurality of branches coupled between the links wherein each of the branches includes a communications unit within each branch which is capable of blocking branch communications between the links,
circuitry for sending a communication signal on the first link and detecting the communication signal at the respective communication unit within each branch;
further circuitry for sending a communication signal on the at least second link to the communication units within the branches; and indicating an open circuit trouble condition if the communication units within the branches did not receive both the communication from the first link and the at least second link; and
wherein the location of the open circuit is determined by a common controller sending a command for the devices from both the first link and the second link and the devices that do not receive the command from both links send an open circuit message to the common controller.

55. A system as in claim 54 wherein the communications signals are transmitted simultaneously on both the first and at least second links.

56. A system as in claim 54 wherein the respective communications unit unblocks the respective branch after it determines that there is an open circuit condition on the branch.

57. A system as in claim 54 wherein the respective communications unit transmits a trouble indicator.

58. A system as in claim 57 wherein the trouble indication is displayed at a remote location.

59. A system as in claim 57 wherein the trouble indication is displayed at the said communications unit.

60. A system as in claim 54 wherein a common controller sends commands to the communication unit to block or unblock the branch.

61. A system as in claim 54 wherein the said communication unit has been preprogrammed to automatically block or unblock the branch.

62. A system as claim 54 wherein the said communication unit is one of an ambient condition detector, an input module, and an output module.

63. A system as in claim 62 wherein the ambient condition detector is at least one of a smoke detector, a gas detector, a heat detector, a light detector, and a sound detector.

64. A system as in claim 54 wherein the selected condition is an open circuit in the branch and the location of the open circuit is determined from the devices that are between the open circuit and the communication unit transmitting messages.

65. A system as in claim 54 wherein the trouble condition is an open circuit in the branch and the location of the open circuit is determined by the devices installed on the branch receiving a transmission from the said communication unit after it unblocked the branch.

66. A communication system comprising:

at least first and second communications links;

a plurality of branches coupled between the links wherein each of the branches includes a plurality of communications units coupled thereto and circuitry in each branch whereby communications between the links can be blocked on all branches, except for a selected branch whereby a discontinuity in the selected branch can be sensed.

67. A system as in claim 66 comprising a programmed control element coupled to the links and including prestored executable instructions for sensing the discontinuity in the selected branch.

68. A system as in claim 67 which includes circuitry for establishing the location of the discontinuity in the selected branch.

69. A system as in claim 66 which includes prestored executable instructions for sequentially determining the existence of a discontinuity in more than one of the branches.

* * * * *